April 13, 1943.  N. F. AGNEW ET AL  2,316,211

ELECTRICAL FENCE CHARGING APPARATUS

Filed Sept. 6, 1939

INVENTORS
Norman F. Agnew and
BY Willard P. Place.
Paul P. Sosinski
THEIR ATTORNEY Patented Apr. 13, 1943

2,316,211

UNITED STATES PATENT OFFICE 2,316,211

ELECTRICAL FENCE CHARGING APPARATUS

Norman F. Agnew and Willard P. Place, Wilkinsburg, Pa.

Application September 6, 1939, Serial No. 293,582

3 Claims. (Cl. 256—10)

Our invention relates to electrical fence charging apparatus and more particularly to apparatus of this character which is capable of destroying vegetation growing in close proximity to an electrically charged conductor, for the purpose of avoiding the occurrence of undesired grounds on the conductor.

One important application of apparatus embodying our invention arises in connection with electrical fence charging installations wherein a suitable charge is impressed upon a stock-enclosing conductor or fence for the purpose of keeping farm stock from straying beyond the enclosure. In such installations, it is usual to impress the charging potential between one or more of the enclosing conductors and ground so that an animal coming in contact with the conductor will complete a discharge circuit to ground. Since the fence charging apparatus, to be safe, must incorporate certain current limiting features, it is apparent that the presence of an appreciable leakage current from the fence to ground such as may be caused by weed growths touching the charged conductor will impair the effectiveness of the stock enclosure. This problem is particularly acute in the case of an electric fence several miles long passing over uncultivated land or over moist ground where vegetation growth may be abundant. Difficulty is also encountered in the case of a low fence close to the ground, such as is required for herding small farm stock.

One object of apparatus embodying our invention is to render such an electric fence automatically self-cleaning with respect to vegetation coming in contact therewith, thus avoiding the necessity for frequent periodic inspection of the fence and manual cutting of the weed growth. Another object of the apparatus embodying our invention is to prevent the growth of vegetation over any desired area or along a right-of-way. A further object of our invention is to incorporate the weed-killing or self-cleaning features into the fence charging apparatus itself so that the one unit will serve both purposes. Another object of our invention is to provide an alarm suitable for detecting the presence of burglars or other unauthorized persons coming in contact with the charged conductor and thereby placing a partial short-circuit on the apparatus. Further objects and advantages will appear as the description progresses.

We shall describe several forms of apparatus embodying our invention and shall then point out the novel features thereof in claims.

Figure 1:
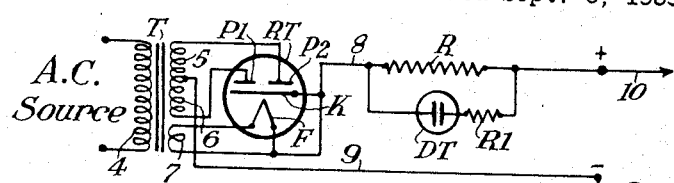

In the accompanying drawing, Fig. 1 is a diagrammatic view showing one form of apparatus for preventing short-circuits by vegetation embodying our invention. Figs. 2, 3, 4, 5, and 6 are diagrammatic views showing modified forms of the apparatus of Fig. 1, also embodying our invention. Fig. 5 shows, in addition, apparatus embodying our invention for providing an alarm when contact is established with the charged conductor. Figs. 1a to 6a, inclusive, show diagrammatically the form of the voltage or current output of the apparatus shown in Figs. 1 to 6, inclusive.

Similar reference characters refer to similar parts in each of the several views.

We have discovered in the course of practical operation of apparatus embodying our invention that within the range of voltages such as are safe for the purpose of fence charging, the polarity of the potential on the charged conductor plays an extremely important part in determining the effectiveness of the apparatus in keeping the fence clear of weeds. We have found, for example, that if the charged conductor is made positive, as indicated by a voltmeter or a milliammeter connected between the conductor and ground, then the apparatus is highly effective even at relatively low values of discharge current, and even if the potential is not applied constantly but is applied for periods of time at relatively infrequent intervals. On the other hand, if the charged conductor is made negative with respect to ground, or if the potential impressed thereon is alternating in character, then the effectiveness of the potential in destroying weeds is, for all practical purposes, negligible at values of steady current or impulse current such as can be considered safe for fence charging purposes. Accordingly, our invention includes as one of its important features the placing of a positive charge upon the conductor and supplying the conductor with a substantially unidirectional potential.

Referring now to the apparatus itself, we have shown in Fig. 1 of the drawing a combined fence charging and weed destroying system for use where an alternating current source of supply is available. The step-up transformer T has its primary winding 4 connected across the terminals of a suitable alternating current source (which may be the usual 60 cycle commercial source) and has a mid-tapped secondary winding made up of portions 5 and 6 connected respectively with the anode terminals P1 and P2 of the full-wave rectifying tube RT. This tube has a cathode K and a heater element F which is energized from a filament winding 7 on the transformer. The mid-point of the transformer secondary is connected with the ground G over the conductor 9, and the cathode K is connected with the charged conductor or fence 10 over the wire 8 and a protective resistor R of comparatively high value. The purpose of the resistor R is to limit the maximum current output of the apparatus to a safe value of the order of a few milliamperes when contact is established between the charged conductor and ground. This resistor may be of the order of one megohm and the peak open circuit potential on the conductor 10 may vary from two or three hundred volts to about one thousand volts. These values are, of course, merely illustrative and may be widely departed from in service, depending on the nature of the installation and the character of the service which it is to perform.

The resistor R serves not only to increase the safety of the circuit, but also in conjunction with the discharge tube DT which is connected across its terminals, serves to provide an indication that the resistance between the conductor 10 and the ground has decreased below a predetermined value. As long as the insulation resistance of conductor 10 is above the predetermined value, the current flow and consequently the voltage drop in resistor R will be insufficient to cause the discharge tube to flash over. When, however, the insulation resistance falls below the desired predetermined value, the voltage drop in resistor R will be sufficient to cause the tube DT to discharge and thus to provide an indication that the electric fence requires attention. The tube DT may be any suitable discharge device such as a neon tube having the desired critical breakdown characteristic. The resistor R1 serves to protect the discharge tube, thus prolonging its useful life, and at the same time acts as a protective device to aid in reducing the discharge current to a safe value should contact be established with the charged conductor at a time when the tube is accidentally short-circuited due to failure.

In order to increase the safety of the apparatus still further, the transformer T may be so designed as to have high leakage reactance, thereby additionally limiting the maximum current which can be delivered by the apparatus under short-circuit conditions.

Figure 1A:
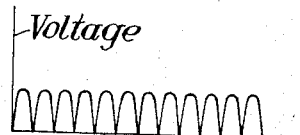

By referring to the voltage curve in Fig. 1a, the general way in which the charge delivered to the enclosing conductor 10 varies with time may be seen. In this figure, the charge consists of rectified full-wave impulses. This curve also represents in a general way the shape of the current wave when a resistance load such as that caused by weeds, farm stock, etc., is connected with the charged conductor.

Figure 2:
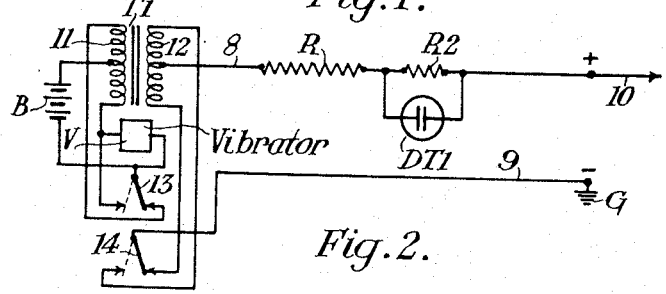

Referring now to Fig. 2, the apparatus of this figure is similar to that of Fig. 1, except that the apparatus is energized from a source of direct current and a vibrator V having rectifying contacts is used for obtaining the necessary unidirectional potential for charging the enclosing conductor or fence. The primary winding 11 of the step-up transformer T1 has a mid-tap to which is connected one terminal of the battery B, the other terminal of the battery being connected alternately, first to one half, and then to the other half of winding 11, over the contact finger 13 of the vibrator V. This vibrator may be of any suitable and well-known design and as shown, is constantly energized from the battery B over an obvious circuit which includes the lower half of winding 11. In operation, the contact finger 13 alternately causes the flux in the core of the transformer T1 to reverse at a relatively rapid rate by virtue of the alternate energization in opposite directions of the two halves of the primary winding, thus causing an alternating output voltage of substantial magnitude to be induced in the secondary winding 12.

The output from the transformer T1 is rectified over a second contact finger 14 of the vibrator and is impressed, as in Fig. 1, across the conductors 8 and 9. The polarity is so selected that the charge on wire 8 is positive with respect to wire 9 which is connected to ground at G. Wire 8 is connected with the charge conductor 10 through a protective resistor R, as in Fig. 1, and also through a second resistor R2 around which is connected the discharge tube DT1. The resistor R2 has a relatively low ohmic value as compared with resistor R, its resistance being sufficient merely to provide a potential drop adequate to cause the tube DT1 to glow in the event that conductor 10 becomes grounded. By connecting the tube DT1 around resistor R2 rather than around the protective resistor R as in Fig. 1, an accidental short-circuit in the tube will not short-circuit the protective resistor, thus adding to the safety of the circuit.

The transformer T1 may have high leakage reactance, if desired, thus aiding the resistor R in limiting the maximum current output of the apparatus. Since the vibrator V is well known, the structure of this vibrator has not been shown in detail. It will be understood that as long as the battery is connected across the vibrator, the contact fingers 13 and 14 will continue to operate, alternately closing the right-hand and left-hand contacts of the vibrator. As shown, the vibrator is connected to the battery B over one-half of the winding 11 of transformer T1, but this connection is not essential and the vibrator may be connected directly across the battery, if preferred.

Figure 2A:
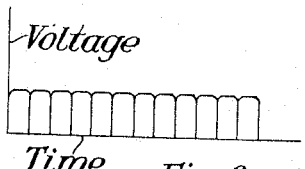

The output of the apparatus of Fig. 2 is indicated diagrammatically in the voltage or current curve of Fig. 2a and is generally similar to that delivered by the apparatus of Fig. 1, except that the curve is somewhat square-topped in form, rather than rectified sine wave in form.

Figure 3:
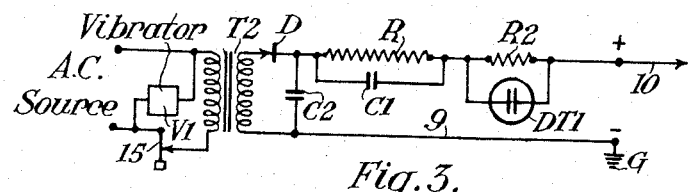

Referring to Fig. 3, the apparatus of this figure provides a rectified output as in Fig. 1, which is periodically interrupted by a suitable vibrator or chopper device V1 having a contact in the input circuit of the step-up transformer T2. The rate at which the contact 15 periodically opens and closes may be of the order of 40 to 60 times per minute and the "on" period or length of time during which this contact remains closed in each cycle may be adjusted to as short a time as is necessary to administer the desired shock. The periodic operation of the chopper V1 serves to conserve power during the "off" intervals and also aids disengagement of the stock coming in contact with the charged conductor.

The output from the transformer T2 is passed through a suitable asymmetric unit D such, for example, as a copper oxide rectifier so that it will be substantially unidirectional in character. The resistors R and R2, and discharge device DT1 perform the same functions as the corresponding apparatus of Fig. 2. The condenser C1 by-passes the impulse component of the output around the resistor R, and the condenser C2 maintains an initial charge between the conductor 10 and ground at all times, thus maintaining the effectiveness of the conductor during the "off" periods between impulses. In practice, these condensers are so proportioned that condenser C1 will by-pass the higher harmonics, thus permitting a large part of the surge or impulse current to go through, whereas the condenser C2 will accumulate a unidirectional charge during the time when an impulse is passing through the rectifier and will then discharge slowly during the intervals between impulses, thus keeping the line partially effective, even during the "off" periods.

Figure 3A:
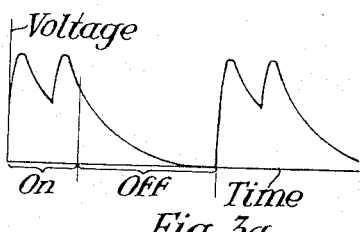

The voltage or current output of the apparatus of Fig. 3 is indicated in a general way in Fig. 3a. Since a half-wave rectifier is used, only the positive peaks appear on the conductor 10 and these are effective for relatively short "on" periods only, due to the action of the shopper contact 15.

Figure 4:
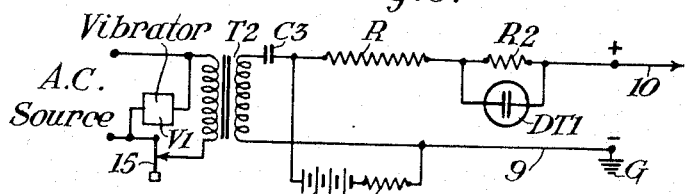
Figure 5:
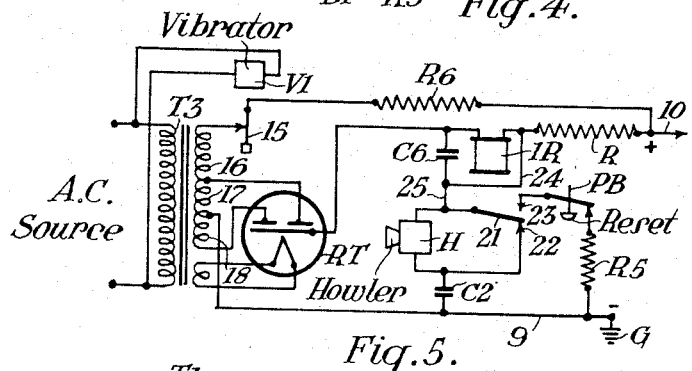

The apparatus shown in Fig. 4 is similar to that shown in Fig. 3, except that instead of using rectified alternating current for providing the unidirectional energy for weed destruction, an independent source of direct current B1 is used for superimposing a unidirectional component on the alternating current shock impulses. The transformer T2 supplies the shock potential, as in Fig. 3, through the resistors R and R2. The condenser C3 prevents the output winding of the transformer T2 from short-circuiting the battery B1 but permits the alternating current output to pass freely therethrough. The resistor R3 provides a means of adjusting the current flow from the battery B1. Since the battery B1 provides a constantly effective unidirectional voltage, the condenser C2 of Fig. 3 may be dispensed with in Fig. 4.

Figure 4A:
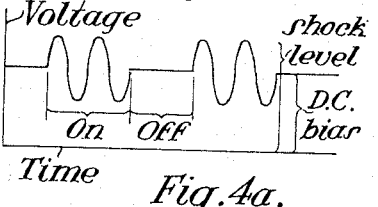

Fig. 4a shows in an approximate manner the nature of the voltage or current output delivered to the charged conductor by the apparatus of Fig. 4. The charge on the conductor is seen to alternate between a relatively high and a relatively low positive value, with the direct current bias effective between shock impulses.

Referring now to Fig. 5, this figure combines the apparatus of Fig. 1 which provides the unidirectional bias for weed destruction, with that portion of the apparatus of Fig. 4 which provides an alternating current shock, and incorporates alarm apparatus which provides a warning when contact is established with the charged conductor. Since it is desirable to maintain the unidirectional bias effective for appreciable periods of time without interruption, the vibrator contact 15 is connected in the output rather than the input circuit of the transformer T3. In this manner, the shock potential which is impressed between conductor 10 and ground by windings 16 and 17 is intermittent in character, whereas the unidirectional bias which is impressed alternately by windings 17 and 18, through the rectifying tube RT, is substantially constant. The resistor R6 limits the current in the shock circuit to a safe value, whereas the resistor R performs a similar function in the circuit which supplies the bias potential.

The circuit of Fig. 5 is useful not only for keeping a charged enclosure free of grounds due to vegetation, but also provides a useful circuit for guarding an enclosure against entry by burglars or other unauthorized persons. In order to provide an indication or alarm of contact with the charged conductor by such persons, we have provided novel alarm apparatus which includes a normally deenergized indication relay IR which controls a horn or "howler" H and which, in turn, is controlled by a reset push button PB. The relay IR is so designed as to pick up on the current from the tube RT flowing through the charged conductor 10 when contact is established between this conductor and ground through the body of a person or otherwise.

The "howler" H is normally short-circuited over the back contact 21—22 of the relay IR and so is normally inoperative. When relay IR picks up, opening contact 21—22, energy from the tube RT will flow through the condensers C6 and C2, thus energizing the "howler" to provide the desired indication of contact with the charged conductor. Once relay IR picks up, a holding circuit for this relay becomes effective by virtue of the partial short-circuit which is established across the line through wires 24 and 25, front contact 21—23 of relay IR, reset button PB, and grounding resistor R5. Accordingly, relay IR will remain energized and the alarm will continue until such time as operation of the push button PB opens the holding circuit and restores the alarm apparatus to its normal inactive condition.

The purpose of condenser C2 is the same as that served by the corresponding condenser in connection with the apparatus of Fig. 3, namely, to improve the output of the rectifying tube. The condenser C5 permits the pulsating current in the output of the rectifying tube to be by-passed to the charged conductor 10 around the inductance due to the winding of relay IR which would otherwise impede the flow of this current. Condenser C6 also completes the circuit to the "howler" H when contact 21—22 of relay IR is open.

The alarm apparatus shown in Fig. 5 may be incorporated into any of the other figures of the drawing when it is desired to use the apparatus of these figures for protective purposes to prevent entry of a building or enclosure by unauthorized persons.

Figure 5A:
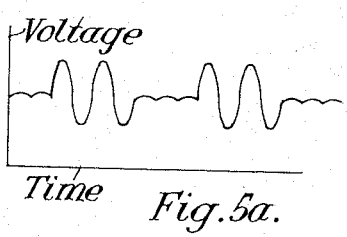

The voltage or current which is effective in the output circuit of Fig. 5 is shown diagrammatically in Fig. 5a. The current which passes through the "howler" H has the same general form as that indicated by the curve shown in Fig. 1a.

Figure 6:
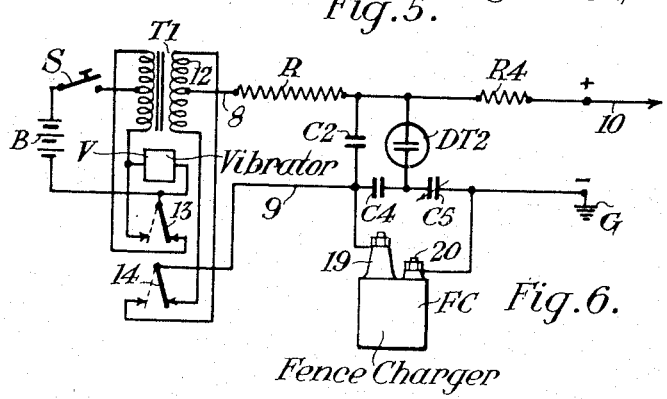
Figure 6A:
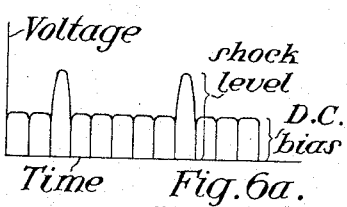

Referring now to Fig. 6, this figure shows one manner in which the weed-destroying apparatus embodying our invention may be combined with a fence charger unit to provide the advantages of the apparatus shown in the previous figures, without the necessity for altering the fence charger unit itself or its internal connections in any way. The unit FC may be any suitable type of fence charger which delivers an alternating or a direct current output, either steadily or in impulse form, for charging the usual electric fence or conductor. The basic circuit which we have chosen for obtaining cooperation with the unit FC is the circuit of Fig. 2, modified slightly to adapt the apparatus for operation in conjunction with the charger unit.

The output from the transformer T1, as rectified by the vibrator V, is impressed across the wires 8 and 9, as in Fig. 2, and is conducted to wire 10, on the one hand, over the resistors R and R4, and to ground, on the other hand, through the high tension terminal 19 of the fence charger, the internal connections of the charger, and the ground terminal 20. One path for the output from the fence charger FC is from terminal 19, through wire 9, contact finger 14 of the vibrator V, one or the other half of the output winding 12 of transformer T1, and wire 8, to the conductor 10. Since this output will usually be alternating or pulsating in character, it will also flow freely through the main path provided therefor which includes condenser C2, resistor R4, and conductor 10. The condensers C4 and C5 are used for the purpose of completing a bridge circuit together with the condenser C2 and a phantom condenser (not shown) which results from the inherent electrostatic capacity of the fence wire 10 to ground. This capacity bridge is normally balanced so that the tube DT2 which is connected across the arms of the bridge is inactive, but lights up when the bridge is unbalanced due to a ground on wire 10 which tends to short-circuit the phantom condenser. Resistor R is the protective resistor, as in the remaining figures, and resistor R4 is provided for the purpose of limiting the discharge current from condenser C2 when contact is established with the charged conductor. The value of resistor R4 is comparatively low and may be neglected in considering the condenser bridge circuit. The condenser C5 is made variable in order that the bridge may be balanced for different values of the capacity of wire 10 to ground, as may be required by individual installations.

Since it is only necessary to have the unidirectional potential applied at infrequent intervals for the purpose of destroying weeds coming in contact with the conductor 10, we have provided the switch S which normally disconnects the battery B from the circuit. The discharge tube DT2 is provided for the purpose of indicating when the weed growth, as indicated by a predetermined decrease in the resistance of conductor 10 to ground is sufficient to render it necessary to close the switch S and apply the unidirectional potential. As long as the resistance of conductor 10 to ground is above the predetermined value, the condenser bridge will not be unbalanced sufficiently to cause the discharge tube DT2 to glow. When, however, the resistance of wire 10 to ground falls below the predetermined value, the effect of the capacity to ground will be reduced sufficiently to cause the tube to glow and thereby to indicate the necessity for closing the weed-destroying circuit. As soon as the vegetation growth has been destroyed sufficiently to cause the insulation resistance of conductor 10 to be restored to the desired value, as determined by the cut-off potential of the tube DT2, this tube will cease to glow, thus indicating that switch S may again be opened.

As pointed out hereinbefore, the fence charger unit FC may be of any suitable type and may deliver either an alternating or a direct current output, either steady or intermittent in character. If the output from the unit FC is alternating, it has been our experience that the weeds will not be effectively destroyed. The same is also true if the output is direct current but the charged conductor or fence is made negative with respect to ground. Moreover, even if the charged conductor is made positive, but if the potential is not properly chosen or is not applied for a prolonged time but is applied in intermittent impulse form, then it has been our experience that effective weed destruction will not be obtained. In view of the foregoing considerations, the advantages of the apparatus shown in Fig. 6 as well as of the remaining figures will become readily apparent.

The condensers C2, C4, and C5 of Fig. 6 may have values of the order of 0.25, 0.1, and 0.01 microfarad, respectively. In Figs. 4, 5, and 6 in which a separate unidirectional potential is introduced for weed-destroying purposes, the value of this potential may be of the order of three or four hundred volts, and we have found it ordinarily sufficient if this potential is maintained applied for a period of one or two days at a time. The actual potential appears less important than the current which should be of the order of one to five milliamperes for effective weed destruction. If the unidirectional potential is used for both weed destruction and stock control or for other protective purposes as in Figs. 1, 2, and 3, then the latter considerations determine the value of the potential and the potential in these figures is, as a matter of course, sufficient for weed destruction. It will be noted that in Fig. 3, although the shock potential is of impulse character, the presence of condenser C2 causes an appreciable unidirectional potential to be maintained between the charged conductor and the ground during most of the "off" period. If the fence charger FC in Fig. 6 is of a type which is designed to deliver unidirectional impulses of negative polarity with respect to ground, then the charger should be so connected into the circuit that its positive terminal is connected with wire 9 and its negative terminal is connected with ground.

It will be understood that the various values recited above are merely illustrative of one particular set of apparatus operating to provide the advantages embodied in our invention but our invention is obviously not limited to these values which are recited for the sole purpose of providing a more clear understanding of the invention. We have found that these values may be widely departed from without a substantial sacrifice of the advantages embodied in our apparatus. The apparatus can, of course, be used solely for weed destruction, if desired, without the shock apparatus which is provided for stock herding or other protective purposes.

If the fence charger FC is assumed to deliver alternating current impulses, then the charge on the conductor 10 which is impressed by the apparatus of Fig. 6 is somewhat similar to that shown diagrammatically in Fig. 5a. If the charger delivers unidirectional current impulses, then the resultant output will have a wave form similar to that indicated in the curve of Fig. 6a.

It will be understood that the apparatus of each of the Figs. 1 to 6, inclusive, may be used not only for weed destruction but also for the protection of property to prevent entry by unauthorized persons into a yard, building, or other protected area. When so used, the alarm apparatus of Fig. 5 may be adapted in an obvious manner to provide an alarm in the event that contact is established with the charged conductor.

It will be apparent from the foregoing description that we have provided electrical fence charging apparatus for preventing short-circuits by vegetation and preventing unauthorized entry or escape from an enclosure which is highly effective yet simple, reliable, and safe in its operation. When used as a fence charger for herding farm stock, the apparatus provides a combination which is comparatively free from the trouble and annoyance caused by grounds on the charged conductor.

Although we have herein shown and described only a few forms of apparatus embodying our invention, it is understood that various changes and modifications may be made therein within the scope of the appended claims without departing from the spirit and scope of our invention

Having thus described our invention, what we claim is:

1. Apparatus for preventing short-circuits on a charged conductor by vegetation coming in contact therewith comprising, a transformer delivering periodic current from its output winding and having one terminal of said winding connected with ground, a continuous electrical connection between the other terminal of said winding and said conductor, means for impressing a unidirectional characteristic on the output of said transformer in a direction to render the unidirectional energization of said conductor positive with respect to ground, and means operating independently of said first-mentioned means for limiting the current output from said transformer to a safe value in the event of a short-circuit between said conductor and ground.

2. Apparatus for electric fence charging and for preventing short-circuits on said fence by vegetation coming in contact therewith comprising, in combination, a source of periodic current having one terminal connected with ground, a continuous electrical connection between the other terminal of said source and the fence wire, means for impressing a unidirectional characteristic on the current supplied from said source to said fence wire in a direction to make the polarity of the fence wire positive with respect to ground for the purpose of effectively destroying said vegetation, said unidirectional current being sufficient for providing a warning shock to farm stock coming in contact with said fence, and current limiting means operating independently of said aforementioned means for limiting the current output of said apparatus to a predetermined safe value, whereby said apparatus will be effective for said purposes but will not endanger human beings or livestock.

3. The combination in a system for energizing a fence for the purpose of causing weeds touching the fence to lose contact therewith, of a source of periodic current having one terminal connected with ground, a continuous electrical connection between the other terminal of said source and the fence wire, means for impressing a unidirectional characteristic on the current supplied from said source to said fence wire in a direction to make the polarity of the fence wire positive with respect to ground, and means for limiting the current output of said system to a predetermined value of the order of a few milliamperes, whereby said system will be effective for said purpose but will not endanger human beings or livestock.

NORMAN F. AGNEW.
WILLARD P. PLACE.